United States Patent [19]

Soni et al.

[11] Patent Number: 4,832,248

[45] Date of Patent: May 23, 1989

[54] ADHESIVE AND SOLDER CONNECTION DEVICE

[75] Inventors: Pravin L. Soni, Union City; Jerry S. Rawls, Atherton, both of Calif.

[73] Assignee: Raychem Corporation, Menlo Park, Calif.

[21] Appl. No.: 934,237

[22] Filed: Nov. 20, 1986

[51] Int. Cl.[4] .......................... H01R 4/70; B23K 3/00

[52] U.S. Cl. ................................ 228/56.3; 174/84 R; 174/DIG. 8

[58] Field of Search ................. 228/56.3, 175; 156/49, 156/158, 90; 174/84 R, DIG. 8

[56] References Cited

U.S. PATENT DOCUMENTS

| | | | |
|---|---|---|---|
| 3,525,799 | 8/1970 | Ellis | 228/56.3 X |
| 3,777,048 | 12/1973 | Traut | 156/49 X |
| 3,899,807 | 8/1975 | Sovish et al. | 156/215 X |
| 4,139,613 | 2/1979 | Hefele | 156/283 |
| 4,183,978 | 1/1980 | Hefele | 156/177 X |
| 4,341,921 | 7/1982 | Simpson | 174/84 R |
| 4,440,821 | 4/1984 | Komura et al. | 174/DIG. 8 |
| 4,581,276 | 4/1986 | Kunert et al. | 156/108 X |
| 4,696,841 | 9/1987 | Vidakovits | 174/DIG. 8 |
| 4,722,471 | 7/1988 | Gray et al. | 228/56.3 X |
| 4,728,550 | 3/1988 | Van Beersel et al. | 174/DIG. 8 |
| 4,732,412 | 3/1988 | Van der Linden | 174/DIG. 8 |

FOREIGN PATENT DOCUMENTS 141675A 5/1985 European Pat. Off. .

*Primary Examiner*—Kenneth J. Ramsey

*Attorney, Agent, or Firm*—Simon J. Belcher; Herbert G. Burkard

[57] ABSTRACT

A device for electrically connecting together two wires and sealing the joint comprises a dimensionally-recoverable sleeve having a central solder insert and end adhesive inserts. The adhesive inserts comprise a higher viscosity adhesive that acts as a dam restricting flow of the lower viscosity adhesive.

14 Claims, 4 Drawing Sheets

FIG. 1A
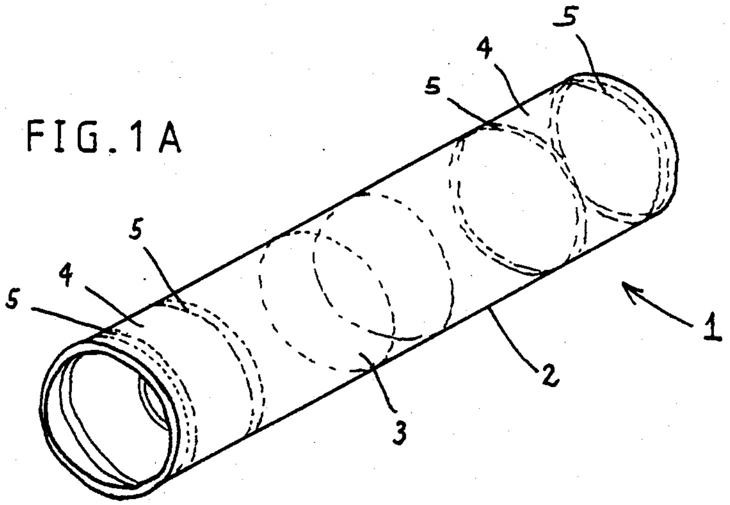
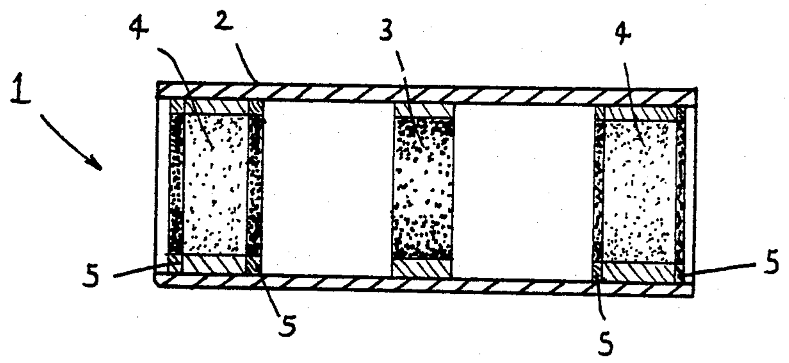
FIG. 1B

ADHESIVE AND SOLDER CONNECTION DEVICE

This invention relates to devices for forming solder connections for example electrical connections between electrical conductors or mechanical connections between pipes and other equipment. In particular the invention relates to such devices that are dimensionally heat-recoverable.

Heat-recoverable articles are articles the dimensional configuration of which may be made substantially to change when subjected to heat treatment.

Usually these articles recover, on heating, towards an original shape from which they have previously been deformed but the term "heat-recoverable", as used herein, also includes an article which, on heating, adopts a new configuration, even if it has not been previously deformed.

In their most common form, such articles comprise a heat-shrinkable sleeve made from a polymeric material exhibiting the property of elastic or plastic memory as described, for example, in U.S. Pat. Nos. 2,027,962; 3,086,242 and 3,597,372. As is made clear in, for example, U.S. Pat. No 2,027,962, the original dimensionally heat-stable form may be a transient form in a continuous process in which, for example, an extruded tube is expanded, whilst hot, to a dimensionally heat-unstable form but, in other applications, a preformed dimensionally heat-stable article is deformed to a dimensionally heat-unstable form in a separate stage.

In the production of heat-recoverable articles, the polymeric material may be cross-linked at any stage in the production of the article that will enhance the desired dimensional recoverability. One manner of producing a heat-recoverable article comprises shaping the polymeric material into the desired heat-stable form, subsequently cross-linking the polymeric material, heating the article to a temperature above the crystalline melting point or, for amorphous materials the softening point, as the case maybe, of the polymer, deforming the article and cooling the article whilst in the deformed state so that the deformed state of the article is retained. In use, since the deformed state of the article is heat-unstable, application of heat will cause the article to assume its original heat-stable shape.

In other articles, as described, for example in British Patent No. 1,440,524, an elastomeric member such as an outer tubular member is held in a stretched state by a second member, such as an inner tubular member, which, upon heating weakens and thus allows the elastomeric member to recover.

Heat-recoverable articles have become widely used for forming solder connections between electrical conductors in view of the ease of forming the connection and the quality of the connection so formed. For such applications the article, usually in the form of a sleeve, contains a quantity of solder for forming the electrical connection and a pair of fusible inserts for sealing the connection. These articles are described for example in U.S. Pat. Nos. 3,243,211, 4,282,396. and 4,283,596, European Patent Publication No. 0,172,072 and British Patent No. 1,470,049 the disclosures of which are incorporated herein by reference, and are sold by Raychem Corporation, Menlo Park, Calif. under the trade mark "SOLDER SLEEVE" amongst others. Similar articles are, also disclosed in U.S. Pat. Nos. 4,504,699, 4,292,099 and 4,282,396, which disclosures are, also incorporated, wherein by reference.

European Patent Publication No. 0,172,072 discloses a solder connection between a plurality of elongate bodies, which comprises a hollow, dimensionally heat-recoverable article having an aperture therein, the article containing a first solder insert for forming a solder connection between the bodies and containing a second solder insert, each insert being arranged to flow directly onto the bodies when the device is heated, the second insert being located adjacent to the first insert and responding to heat applied to the article more slowly than the first insert, so that, when the device is heated to form the connection, the second insert acts as a barrier to control the extent of flow of the fused solder insert along at least one of the bodies.

Although such devices are satisfactory for many applications, in certain unfavorable instances the quality of the environmental seal formed may depend on the skill of the installer, and, in particular, the devices may be sensitive to underheating or overheating or both. This may result in unreliable long term performance especially in corrosive environments or under severe mechanical stress, or damage to the sleeve of the device or the insulation surrounding the conductors to be connected.

The present invention provides a device for forming a solder connection between a plurality of elongate bodies, which comprises a hollow, dimensionally heat-recoverable sleeve having an aperture therein, the article containing a solder insert for forming a solder connection between the bodies, and first and second heat-activatable adhesive inserts for environmentally sealing said aperture, said second adhesive insert having a higher viscosity than said first insert at the recovery temperature of the sleeve, and being positioned with respect to the first insert to restrict flow of the first insert under the recovery force of the sleeve.

Preferably at least one of the bodies is elongate, and usually the device is used to connect two elongate bodies, for example wires or pipes. A particularly preferred use is the connection of a ground lead to an outer conductor of a cable. The ground lead, which comprises one of the bodies, may be pre-affixed to the device.

The term "solder" as used herein includes both conventional metallic solder and solder adhesives in which a hot-melt adhesive, e.g. a polyamide hot-melt adhesive, or a thermosetting adhesive such as an epoxy adhesive, is filled with metal particles, e.g. with silver flake. In most cases, however, the solder insert will be formed from conventional metallic solder. If desired, two or more solder inserts, having the same or different properties, may be provided.

The solder may comprise any suitable composition, for example a 63% Sn/37% Pb eutectic, a 96% Sn/4% Ag eutectic, or a non-eutectic composition, e.g. 50% Sn/50% Pb.

The device may be formed in the form of a simple open-ended sleeve, each end of which is intended to receive one of the bodies to be connected. The dimensions of the sleeve may be substantially uniform, or one end may be larger than the other in order to accommodate a relatively large body. The device may be of any suitable size and is preferably from 0.5–5 cm in length and 0.2–3 cm in diameter. This may for example be the case where two pipes are intended to be joined, one pipe being larger than the other in order to receive the other therein. Alternatively the heat-recoverable article may be in the form of a cap, for example for forming a stub joint between a number of electrical conductors all of which are inserted into one open-end of the device. In another form of device which provides -a composite connector, the article may have a metal connection element, e.g. a short piece of braid in the case of a coaxial cable connector. The solder insert is preferably positioned in the article substantially mid-way between its open ends, and the first and second adhesive inserts are preferably positioned adjacent each of the open ends. Yet another form of device may be a multiple connector in which an array of hollow articles has been formed by bonding together a pair of superimposed webs of polymeric material at spaced apart intervals and then cross-linked, for example as described in British Patent Specification No. 2,084,505A, the disclosure of which is incorporated herein by reference.

The solder insert may have any of a number of configurations and may be located concentrically or eccentrically within the article. Preferably, however, the insert is arranged to extend around at least one of the bodies to be inserted, and is preferably therefore in the form of a ring arranged substantially coaxially within the article.

Although this is not necessary, it may be desirable to provide the device with a temperature indicator, for example a thermochromic material, in order to indicate when sufficient heat has been applied. Preferably this indicator is contained in a flux used with the solder insert. Examples of thermochromic indicators are given British Patent Specification No. 2,109,418A, the disclosure of which is incorporated herein by reference.

If desired one or more conductors (or other bodies) may be pre-installed in the article, e.g. as described in U.S. Pat. No. 4,060,887 or UK Patent Specification No. 1,599,520, the disclosures of which are incorporated herein by reference, so that, in some cases, only a single conductor need be inserted in the device when the connection is made.

The adhesive inserts may cover the whole of the inner surface, or may be present on part of the inner surface such as rings located, for example adjacent to the ends of the device, as mentioned above. The adhesive may comprise, for example a fluorinated polymer such as polyvinylidene fluoride, an olefin homo-or copolymer such as polyethylene, an ethylene vinylacetate copolymer, a polyamide, or a blend thereof, particularly an ethylene vinyl acetate containing polyvinylidene fluoride. The two adhesive inserts may comprise the same basic chemical compositions or they may comprise different compositions. For example, they may both be blends of the same two or more polymers, but in different proportions such that different viscosities or softening points result. They may contain different or different amounts of some filler. They may have different molecular weights due to different degrees of polymerization, or they may be cross-linked to different extents, by which terms we include a preferred arrangement wherein the first adhesive is non cross-linked and the second is cross-linked. Cross-linking is preferably by electron beam radiation, and a suitable dose is from 10–30 megarads, especially from 15–25 megarads. We have found that such cross-linking provides a further significant benefit, especially in conjunction with wires or other bodies of slippery surface, such as polytetrafluoroethylene (such as that sold under the trade mark Teflon) coated wires. The cross-linking helps to retain the adhesive in good contact and adhesion to the surface.

Where the first and second adhesive inserts are parts of an adhesive member of unitary construction a different extent of cross-linking between the first and second inserts may arise from uniform radiation but localized addition of prorads and/or antirads. Alternatively, the part of the member that is to become the first insert could be shielded from the radiation. A preferred adhesive composition comprises a blend of (a) ethylene vinylacetate, (b) polyvinylidene.: fluoride and (c) a copolymer of vinylidene, fluoride and tetrafluoroethylene and/or hexafluoropropylene (for example Viton, trade mark), each being present as 25–40% by weight of the total, and preferably in substantially equal amounts by weight. A blend such as this may exhibit more than one melting point and the melting point that we are concerned with, is the one that most affects the bulk flow of the material. The blend mentioned will melt primarily at about 90° C., but there will be some further melting (due to a dispersed phase) at about 170° C.

Suitable materials for the heat-recoverable article of the present invention include alkene homo- or copolymers, for example polyvinylidene fluoride, and polyethylene. Such materials may be cross-linked.

In order to form a solder connection between a plurality of bodies by means of the device according to the invention, the bodies are introduced into the appropriate position within the device and the device is heated to melt the solder insert, the first and second adhesive inserts, and to recover the article about the bodies.

The events that should occur during installation of the device are complex, and it is a far from trivial problem to ensure that the correct events occur in the correct order. The device is intended to provide highly reliably an electrical (or other) connection that must last for may years under unfavorable conditions. Such unfavorable conditions may include wet and corrosive environments and severe mechanical strain. The adhesive must provide an environmental seal and in general must provide strain relief under these exacting conditions.

We believe that, in general, the following events must occur, on heat installation. Firstly, the recoverable sleeve begins to shrink (or otherwise become heat activated) but a complete seal is not mode at this stage. Then the solder melts, and as the sleeve shrinks, air within it will be driven out. As the sleeve recovers further and all the necessary air is expelled the first adhesive insert flows and makes a desired seal but is prevented from flowing where it is not wanted due to the second adhesive insert which has a high enough viscosity for it to remain substantially where it is desired. The heating is then stopped, and the device is allowed to cool. The solder solidifies, the second adhesive insert solidifies or hardens trapping the first adhesive insert. From this sequence of events, the skilled man will be able to select suitable combinations of sleeve, solder, and first and second inserts. In general the various relevant temperatures are preferably in the following ascending order: sleeve recovery temperature; first adhesive melt temperature; solder melt temperature; second adhesive melt temperature. The adhesives need not melt but may merely soften, and of course the second adhesive may begin to soften at any temperature so long as it retains sufficiently high viscosity.

The recovery temperature of the sleeve is preferably from 140°–350° C., especially from 170°–300° C.

The first adhesive preferably melts between 70°–180° C., especially 80°–100° C.

The second adhesive preferably has a higher viscosity than the first adhesive over the range 80°-200° C.

The melting point of the solder is preferably 150°-210° C., especially 170°-190° C., particularly about 184° C.

The invention is further illustrated by the accompanying drawings in which:

FIG. 1A, 1B and 1C show a device in the form of a cylindrical open ended sleeve;

FIG. 3A, 3B and 3C show a device incorporating a ground lead; and

Figure 1C:
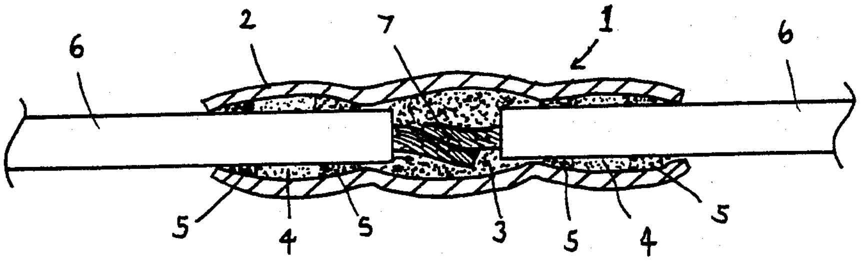

FIG. 1*a* shows, in perspective view, a device 1 in the form of a dimensionally-recoverable sleeve 2 having two open ends, and containing a solder insert 3 and first and second adhesive inserts 4 and 5 respectively. It can be seen that first and second adhesive inserts 4,5 are provided at each open end. Two wires or cables or other bodies to be joined are inserted into the sleeve 2, for example one in each end such that they overlap adjacent the solder insert 3, or are bridged by the solder insert. The device 1 is then heated causing the sleeve 2 to shrink, the solder insert 3 to melt thus joining the two wires, and the adhesive inserts 4,5 to melt or soften as appropriate thus forming in conjunction with the shrinking sleeve an environmental seal at each end of the sleeve. The inserts 5 act as dams restricting the longitudinal flow of the lower viscosity adhesive 4 either towards the aperture and out of the sleeve or away from the aperture towards the mid-point of the sleeve. It is desirable that the lower viscosity adhesive 4 becomes in contact with the wires that are to be sealed within the sleeve, in order that the irregular shaped space around them be filled and that leak paths into the sleeve be prevented. There is not the same preference in respect of the adhesive 5 since it need not have a sealing function. Also, it may be desirable that the lower viscosity adhesive contacts the sleeve, but this may not be necessary if the higher viscosity material bonds well to the sleeve material and there is a bond between the two inserts. Adhesive 4,5 need not be positioned at each end of the sleeve 1 and the high viscosity adhesive 5 need not be provided on each side of the low viscosity adhesive 4. Where the various inserts are positioned will depend upon the particular application. In FIG. 1, inserts 4 or 5 are together provided by an integral adhesive member, but they could be separate.

FIG. 1*b* shows the device of FIG. 1*a* in longitudinal cross-section.

FIG. 1*c* shows the effect of installing such a device around a splice between two wires 6, whose conductors 7 can be seen to be electrically connected by solder insert 3. The adhesive insert 4 (here together with insert 5) can be seen to provide environmental seals between the sleeve 1 and wires 6.

Figure 2:
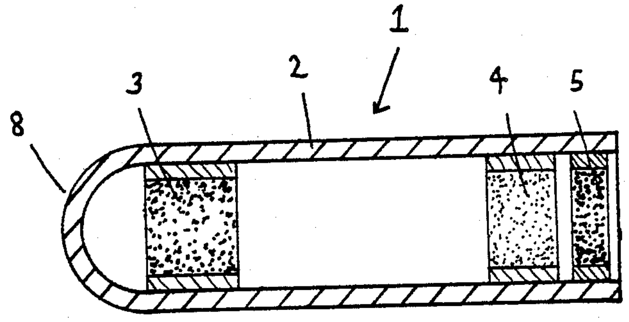
FIG. 2 shows a device in the form of an end cap.

In FIG. 2, the device comprises a sleeve 2 in the form of an end cap. End 8 is blind. Also, here the adhesive inserts 4 and 5 are separate and there is a slight space between them before heat-installation has begun. The combined adhesive means 4,5 of FIG. 1 could, of course, be used in an end cap.

In FIG. 3 the device 1 comprises a sleeve 2 provided with a ground lead 9 of fixed thereto. It is shown with its conductors 7 pre-installed in the solder insert- 3. If desired, the ground lead 9 could be supplied separately or fixed to the sleeve 2 in some other way, contact with a solder insert occurring only during installation. Such a ground lead may be supplied with a wrap of adhesive (for example the higher viscosity adhesive constituting the second adhesive insert, if desired) around it. In FIG. 3, the solder insert is shown localized at one position on the circumference of the sleeve, but it could of course be in the form of a ring as in FIGS. 1 or 2. Analogously, a localized or non-hollow solder insert could be provided in the embodiments of FIGS. 1 or 2.

Figure 3A:
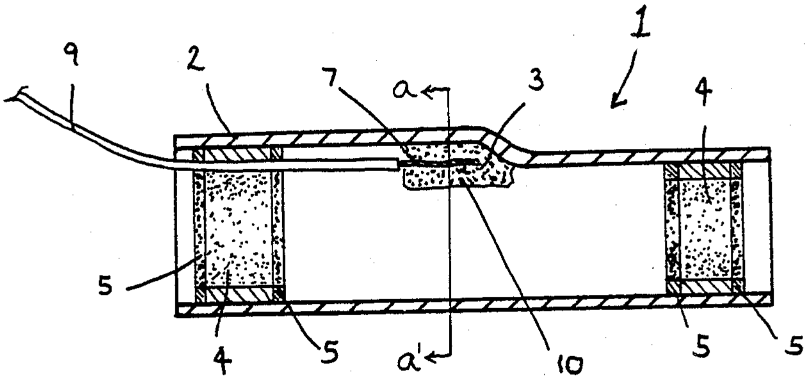
Figure 3B:
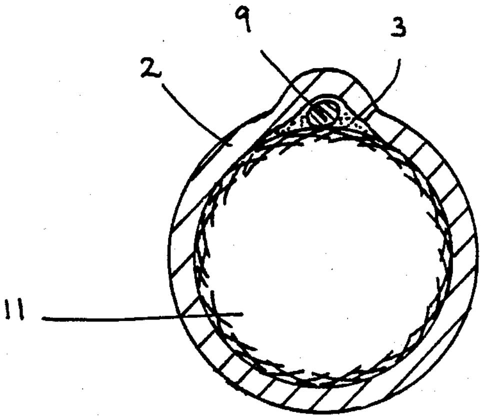

FIG. 3*b* is a transverse cross-section along line a-a' of FIG. 3*a*, but after the device has been installed around a wire or cable 11. The effect is to connect the ground lead 9 to the ground conductor 12 of cable 11 by means of solder insert 3.

Figure 4:
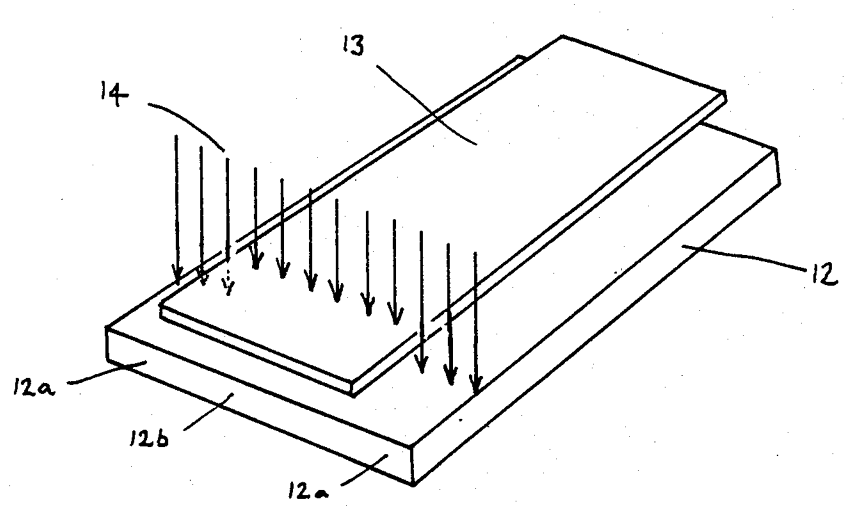
FIG. 4 shows a way of making the adhesive inserts.

FIG. 4 shows one method for making an adhesive member comprising both adhesive inserts. A strip of material 12 is positioned adjacent a shield 13 that leaves exposed edge portions **12*a* whilst covering a central portion 12*b*. An electron beam, or other irradiation means 14, represented schematically by the arrows intercepts the edge portions 12*a* but is shielded from the center portion 12*b*. Thus, the edge portions only become cross-linked (or become cross-linked to a greater extent depending on the transparency of the shield). The edge portions will therefore have a higher viscosity and will function as the second insert 5, while the center portion functions as the first insert 4**. The strip of material is then wrapped to form a cylinder or other shape, as desired, and inserted into a recoverable sleeve. This process could be carried out continuously, and the strip cut to the desired length before wrapping. Alternatively, the inserts could be formed into the desired configuration before cross-linking. The cross-linking could be carried out with the inserts in position with the sleeve. The adhesive preferably consists essentially of polymeric material, and preferably contains substantially no metallic or other conductive filler.

We claim:

1. A device for forming a solder connection between a plurality of elongate bodies, which comprises:

a hollow, dimensionally heat-recoverable sleeve having an aperture therein, the article containing a solder insert for forming a solder connection between the bodies, and first and second heat-activatable adhesive inserts for environmentally sealing said aperture, the first and second adhesive inserts each comprising a blend of polymers, the two blends comprising substantially the same polymers but in different proportions, said second adhesive insert having a higher viscosity that said first insert at the recovery temperature of the sleeve, and being positioned with respect to the first insert to restrict flow of the first insert under the recovery force of the sleeve.

2. A device according to claim 1, in which the first and second inserts each comprise a hot-melt adhesive.

3. A device according to claim 1, in which two said second adhesive inserts are provided positioned with respect to the first insert to restrict flow of the insert respectively towards said aperture and away from said aperture.

4. A device according to claim 1, in which the first and second inserts comprise parts of an integral adhesive member.

5. A device according to claim 1, in which the first and second inserts comprise substantially the same polymer or polymers, the second insert having been cross-linked to a greater extent than the first insert.

6. A device according to claim 1, in which the second insert has a viscosity greater than that of the first insert throughout the temperature range 90°–200° C.

7. A device according to claim 1, in which the sleeve is substantially cylindrical having a length of 0.5–5 cm and a diameter 0.2–3 cm.

8. A device for forming a solder connection between a plurality of elongate bodies, which comprises:

a hollow, dimensionally heat-recoverable sleeve having an aperture therein, the article containing a solder insert for forming a solder connection between the bodies, and first and second heat-activatable adhesive inserts for environmentally sealing said aperture, the first and second adhesive inserts comprising substantially the same polymer or polymers, the second insert having been crosslinked to a greater extent than the first insert so that it has higher viscosity than said first insert at the recovery temperature of the sleeve, and being positioned with respect to the first insert to restrict flow of the first insert under the recovery force of the sleeve.

9. A device according to claim 8, in which the first and second inserts each comprise a hot-melt adhesive.

10. A device according to claim 8, in which two said second adhesive inserts are provided positioned with respect to the first insert to restrict flow of the insert respectively towards said aperture and away from said aperture.

11. A device according to claim 8, in which the first and second inserts comprise parts of an integral adhesive member.

12. A device according to claim 8, in which the first and second inserts each comprise a blend of polymers, the two blends comprising substantially the same polymers but in different proportions.

13. A device according to claim 8, in which the second insert has a viscosity greater than that of the first insert throughout the temperature range 90°–200° C.

14. A device according to claim 8, in which the sleeve is substantially cylindrical having a length of 0.5–5 cm and a diameter 0.2–3 cm.

* * * * *